Figure 1:
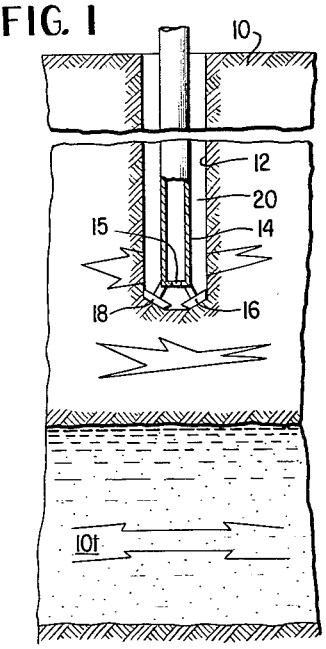

Aug. 10, 1965    J. L. BOYD ETAL    3,199,589
METHOD FOR POLYMERIZING RESIN-FORMING MATERIALS
AND USE IN SUBTERRANEAN AREAS
Filed Feb. 6, 1962    2 Sheets-Sheet 1

INVENTORS
JOHN L. BOYD
ROBERT O. PERRY
BY
ATTORNEYS.

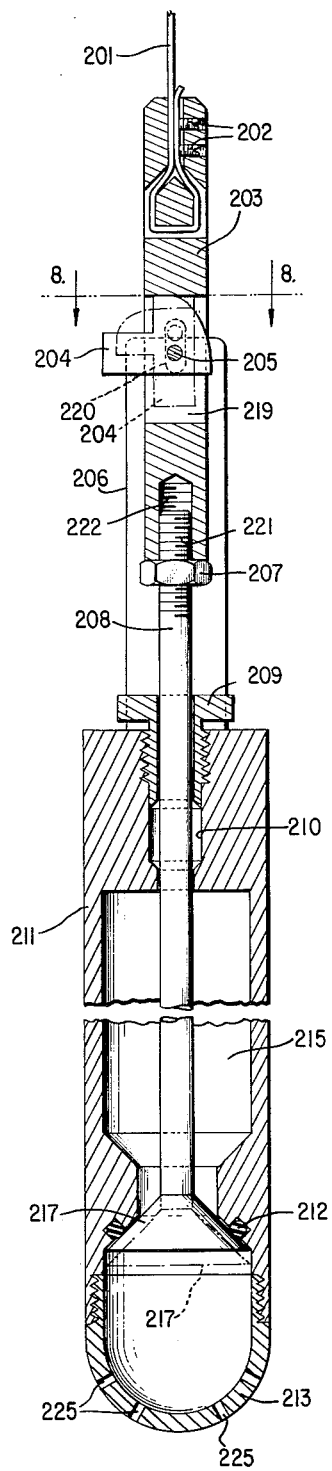
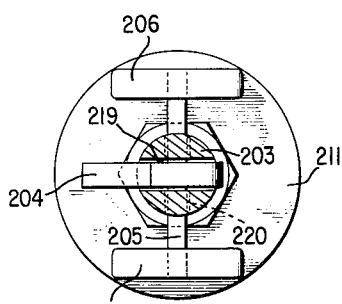
FIG. 7
FIG. 8
INVENTORS
JOHN L. BOYD
ROBERT O. PERRY
ATTORNEYS.

3,199,589
METHOD FOR POLYMERIZING RESIN-FORMING MATERIALS AND USE IN SUBTERRANEAN AREAS
John L. Boyd and Robert O. Perry, Tulsa, Okla., assignors to Sinclair Research, Inc., Wilmington, Del., a corporation of Delaware
Filed Feb. 6, 1962, Ser. No. 171,371
14 Claims. (Cl. 166—33)

This invention relates to a method for polymerizing liquid, resin-forming materials, for instance in subterranean areas. More particularly, the present invention is concerned with a method employing ascorbic acid to coplymerize an aqueous solution of an alkylidene bisacrylamide and an ethylenic monomer.

These resin-forming materials have particular utility in the well treating field, e.g. processes which combat the obstruction of gas circulation when gas-drilling wells through permeable subsurface formations and other processes which partially or completely plug permeable subterranean well areas. Presently, a Redox catalyst system, i.e. an oxidation-reduction catalytic polymerization system, e.g. an ammonium persulfate-sodium bisulfite system, has been added to the liquid resin-forming material near the well site prior to placing the material in the desired location within the well bore. The components of a catalytic system of this type are generally added in amounts to provide initiation of polymerization of the resin-forming material after a predetermined time, e.g. about 30 to 90 minutes, has elapsed in order to provide sufficient working time for a proper placement of this material in the well bore. This procedure can render control difficult during the crucial moments of polymerization since sometimes the polymerization of the material, causing a change from a mobile liquid to a more or less solid mass, is too slow such that any existing turbulence in the well bore will move the material out of position, e.g. deep into a water formation, and thus critically curtail its sealing effect. On the other hand, if the polymerization is too fast, the resin-forming material may set in the apparatus, e.g., drillpipe, used to manipulate the material in the well bore. Use under these conditions also completely disrupts the reproducibility of gel times. Furthermore, it has been very difficult, if not impossible, to make any change in the gel time by chemical means after the solution has been injected into the formation. This means that for the most part once the solution is prepared, the gel time is fixed and cannot be shortened nor lengthened in the event of unforeseen difficulties.

The present invention is directed to a method providing good control of the copolymerization or gel time of an alkylidene bisacrylamide and an ethylenic monomer, particularly when this material is copolymerized in a well bore hole penetrating a permeable subterranean formation. The desired result is accomplished by placing a resin-forming mixture including an aqueous mixture of the polymerizable monomers, i.e. an alkylidene bisacrylamide and the ethylenic monomer, in position in the well and adding catalytic amounts of ascorbic acid to the mixture to effect polymerization of the polymerizable monomers. These amounts of ascorbic acid will generally range from about 0.01 to 1, preferably from about 0.025 to 0.5, weight percent based on the active monomers.

The ascorbic acid can be advantageously employed in conjunction with other components to provide a triggering composition. The ascorbic acid triggering composition is usually an aqueous solution including water in amounts sufficient to solubilize the trigger composition in the resin-forming material, a reducing, inorganic ferrous compound, e.g. ferrous chloride, ferrous sulfate and ferrous ammonium sulfate, and a strong inorganic or mineral acid which is not an oxidizing agent e.g. concentrated HCl (37% concentration) and $H_2SO_4$. The general and preferred approximate amounts of the components of the ascorbic acid-containing composition are set forth in the following table.

| Component | General (Parts by Wt.) | Preferred (Parts by Wt.) |
|---|---|---|
| Ascorbic acid | 0.1 to 10 | 0.25 to 5 |
| Ferrous compound | 1 to 50 | 1.5 to 20 |
| Acid | 0.03 to 7 | 0.1 to 3 |
| Water | Balance | Balance |

The triggering composition could be added in water-free form if desired.

The amount of ferrous compound based on the active monomers will generally range from about 0.1 to 5, preferably 0.15 to 2, weight percent and the mineral acid will generally range from about 0.003 to 1, preferably 0.01 to 0.5 weight percent based on the monomers.

The triggering composition is incorporated into the aqueous resin-forming material in polymerization effecting amounts and are usually employed in amounts sufficient to effect polymerization in a relatively short time, generally less than about 30 minutes and usually less than about 3 minutes or even less than 30 seconds. These amounts preferably with a concentrated composition, can range from about 2 to 25 or more cc. of triggering composition per gallon of active monomers in the aqueous resin-forming material.

The composition is advantageously contacted with the resin-forming material at temperatures from about 50 to 200° F. It is also advantageously fed into the resin-forming material as the latter is conducted from a pipe in the well bore, however, a minimum polymerization time should be provided for to conduct the material into the formation. In this case, the triggering composition can be lowered into the well bore inside the pipe to a point of contact with the resin-forming material wherein the triggering composition is added to the resin-forming material as the material leaves the pipe to effect polymerization of the material. Alternatively, the composition can be conducted to the resin-forming material after the material has been placed in or adjacent the permeable area.

The liquid resin-forming materials polymerized according to the method of the present invention are particularly suitable for use in the well bore treating field and include an aqueous solution of an alkylidene bisacrylamide and ethylenic comonomer, the bisacrylamide having the formula:

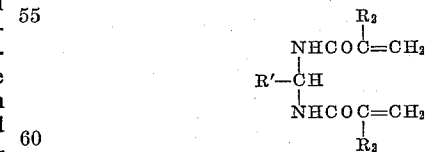

in which

is a hydrocarbon residue of an aldehyde containing, for instance, from about 1 to 10 and preferably from about 1 to 5 carbon atoms, e.g., formalde-, acetalde-, and valeraldehyde; but usually about 1 to 3 carbon atoms; and $R_2$ is a member of the group consisting of hydrogen and a methyl radical.

The other comonomer is a solid, liquid or gaseous ethylenic (i.e. contains at least the >C=C< radical) compound with a solubility of at least about 2 percent by weight, and preferably at least about 5 percent, in water and which copolymerizes with the aforesaid bisacrylamide in an aqueous system. Although not essential in practicing the invention, it is preferred to select an ethylenic comonomer which is preferably soluble or at least self-dispersible in water with appropriate stirring, as such, for example, methylene-bisacrylamide, which is capable of polymerizing.

In addition to the comonomer N,N'-methylenebisacrylamide set out in the examples hereinafter, any of the alkylidene bisacrylamides corresponding to the above formula which are described and claimed in Lundberg Patent No. 2,475,846 hereby incorporated by reference, or mixtures thereof may be used as cross-linking agents. Only slight solubility is required of the alkylidene bisacrylamide in view of the small amount used; therefore, this component may have a water solubility as low as about 0.02 percent by weight at 20° C. but a solubility of at least about 0.10 percent is more desirable for general purposes.

A wide variety of ethylenic comonomers or mixtures thereof are copolymerizable with the alkylidene bisacrylamides; those having a formula containing at least one >C=C< group, preferably containing from about 1 to 8 carbon atoms, hereinafter referred to as the ethenoid group, and having appreciable solubility in water are suitable for use in the present invention. See U.S. Patent No. 2,801,985, hereby incorporated by reference. As set forth in this patent, the unsubstituted bonds in the ethenoid may be attached to one or more of many different atoms or radicals including hydrogen, halogens, such as chlorine and bromine, cyano, aryl, aralkyl, alkyl, and alkylene with or without solubilizing groups attached to these hydrocarbons In addition, the substituents on the ethenoid group may comprise one or more hydrophilic groups including formyl, methylol, polyoxyalkylene residues and quaternary ammonium salt radicals,

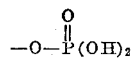

—OOCH; —OOCCH$_3$; —SO$_3$X, where X is H, NH$_4$, an alkali metal or an alkylamine; —CONR$_2$ and —CH$_2$CONR$_2$ where R is hydrogen, alkylol, lower alkyl or a polyoxyalkylene radical; and —COOR' and —CH$_2$COOR', where R' is a H, NH$_4$, alkali metal, alkaline earth metal, organic nitrogenous base, alkylol, lower alkyl or polyoxyalkylene radical. The large number of combinations and proportions of the various suitable substituents makes it impractical to list all compounds in this category which may be employed. The water solubility of these substances is known to depend chiefly on the number and type of hydrophilic and hydrophobic radicals therein; for example, the solubility of compounds containing an alkyl radical diminishes as the length of the alkyl chain increases and aryl groups tend to decrease water solubility whereas the aforesaid hydrophilic substituents all tend to improve the solubility of a given compound in water. Accordingly, the comonomer should be selected according to chemical practice from those containing sufficient hydrophilic radicals to balance any hydrophobic groups present in order to obtain the requisite water solubility of monomer.

Among the water-soluble ethenoid monomers, those containing an acrylyl or methacrylyl groups are especially recommended. These are exemplified by N-methylol acrylamide, calcium acrylate, methacrylamide and acrylamide. Other suitable ethenoid compounds are acrylic acid; other N-substituted acrylamides, such as N-methylacrylamide, N-3-hydroxypropylacrylamide, dimethylamino-propylacrylamide, N-ethylol acrylamide; acrylonitrile; saturated alkyl esters of acrylic acid, i.e. methyl acrylate, β-hydroxyethyl acrylate; ethylene glycol and polyethylene, glycol acrylates, an example being the reaction product of β-hydroxyethylacrylate or acrylic acid with about 1 to about 50 mols or more of ethylene oxide; salts of acrylic acid, i.e. magnesium acrylate, sodium acrylate, ammonium acrylate, zinc acrylate, β-aminoethyl-acrylate, β-methylaminoethylacrylate, guanidine acrylate and other organic nitrogenous base salts, such as diethylamine acrylate and ethanolamine acrylate; quaternary salts like alkyl acrylamidopropyl dimethylamino chloride; acrolein, β-carboxyacrolein, butenoic acid; α-chloroacrylic acid; β-chloroacrylic acid; as well as methacrylic acid and its corresponding derivatives.

Maleic acid and its corresponding derivatives including partial esters, partial salts, and ester salts thereof; maleamic, chloromaleic, fumaric, itaconic, citraconic, vinyl sulfonic, and vinyl phosphonic acids and their corresponding derivatives and mixtures thereof can also be used. Derivatives of this kind and other suitable compounds include α, β-dichloroacrylonitrile, methacrolein, potassium methacrylate, magnesium methacrylate, hydroxyethyl methacrylate, zinc β-chloroacrylate, trimethylamine methacrylate, calcium α-chloromethacrylate, diethyl methylene succinate, methylene succindiamide, monomethyl maleate, maleic diamide, methylene maloanamide, diethyl methylene malonate, methyl isopropenyl ketone, ethyl vinyl ketone, propyl vinyl ketone, vinyl formate, vinyl lactate vinyl acetate, vinyl bromoacetate, vinyl chloroacetate, vinyl pyrrolidone, allyl levulinate, allyl alcohol, methallyl alcohol, diallyl carbonate, allyl lactate, allyl gluconate, di(β-aminoethyl) maleate, di(methylaminoethyl) maleate, di(N,N'-dimethyl-β-aminoethyl) maleate, sulfonated styrene, vinyl pyridine, maleic anhydride, sodium maleate, ammonium maleate, calcium maleate, monopotassium maleate, monoammonium maleate, monomagnesium maleate, methyl vinyl ether, N-aminoethyl maleamide, N-aminoethyl maleimide, alkyl aminoalkyl maleamides, N-vinyl amines, N-allyl amines, heterocyclic ethenoid compounds containing nitrogen in a tertiary amino group, and the amine and ammonium are salts of said cyclic compounds, N-vinyl acetamide, N-vinyl-N-methyl formamide, N-vinyl-N-methylacetamide, N-vinyl succinimide, N-vinyldiformamide, N-vinyl diacetamide, vinyl sulfonyl chloride, vinyl sulfonic acid salts, vinyl sulfonic acid amides, vinyl oxazolidone, allyl amine, diallylamine, vinyl methyl pyridinium chloride, and allyl trimethyl ammonium chloride to name only a few of the operative compounds.

The preferred resin-forming composition employed in the method of the present invention is in an aqueous medium and has an initial viscosity approximating that of water. These compositions can be formed by dissolving a mixture of acrylamide and N,N'-methylenebisacrylamide in fresh water. Generally, this mixture contains about 1 to 25 weight percent of N,N'-methylene-bisacrylamide and about 99 to 75 weight percent of acrylamide. The aqueous solution will usually include from about 5 weight percent of this mixture to its limit of solubility and preferably this amount is about 5 to 25 percent. Although the acrylamide as such is preferred, its nitrogen atom could be substituted as with a hydroxy methyl or a hydroxy ethyl group.

In addition to the above-mentioned ingredients, the resin-forming mixture employed in the process of the present invention may include other components, particularly when they are destined for use in processes for plugging permeable well areas. For instance, calcium chloride can be used in various amounts such as about 0.5 to 5 weight percent to provide advantageous electrical conductivity characteristics to enable detection of the resin-forming material in the well bore or in amounts ranging from about 15 to 30 or more e.g. 35, weight percent based on the aqueous resin-forming mixture and salt, or up to its limit of solubility to provide advantageous weighted or specific gravity characteristics such that the resin-forming material can be efficiently displaced into the permeable area before it can be dispersed by salt or fresh water present in the well bore, i.e. the resin-forming material is made heavier than the salt or fresh water. The calcium chloride also tends to reduce the polymerization time of the resin-forming material, the amount of calcium chloride having a direct relationship on the reduction of the polymerization time. The calcium chloride is exemplary of the halides of metals of Groups I to III of the periodic table of elements which can be employed in polymerization expediting amounts. The halides of halogens having an atomic number from 17 to 35 are preferred. The halides include the alkali and alkaline earth metal halides such as sodium chloride, potassium chloride, magnesium chloride, strontium chloride and calcium chloride as well as their corresponding bromides. Other halides include zinc chloride and aluminum chloride. The halides as specified are not necessarily equivalent from the standpoint of enhancing the polymerization of monomers. Among the halides, calcium chloride and zinc chloride are outstanding in performance, and sodium chloride performs exceptionally well.

An oxidizing agent is advantageously incorporated into the resinous mixture according to the present invention. The oxidizing agent is employed in catalytic amounts and these amounts will generally be from about 0.01 to 2.0 weight percent and preferably from about 0.1 to 0.6 weight percent based upon the weight of the polymerizable monomers. The oxidizing agents are usually inorganic, water soluble materials and include, for instance, any of the usual water-soluble peroxy catalysts derived from peracids such as persulfuric, perchloric, perboric and permanganic and their salts. For example, ammonium, potassium and sodium persulfates, hydrogen peroxide, the alkali metal and ammonium perchlorates and the like may be employed. Care should be exercised as to the amount of additives incorporated into the resin-forming material and this will depend upon the specific additive employed. In general, the initial viscosity of the material at the temperatures and pressures encountered in the bore hole is such that it has a viscosity of up to about 10 to 15 centipoises, advantageously about 1 to 5 centipoises, at these conditions.

As to using these resin-forming compositions in various embodiments of some well plugging processes of the present invention, unless the material is light enough to remain upon the surface of the salt water which has a specific gravity greater than 1, generally at least about 1.2, it should be quickly displaced into the permeable area before it can disperse into the salt water phase or an overlying fresh water layer, if any be present. To reduce the chances of this happening, resin-forming materials having specific gravities of up to about 1.18, preferably up to about 1.13, can be used. Also, as it may be advantageous to locate the resin-forming material between the salt water layer and an overlying fresh water column, the resin-forming material can preferably have a specific gravity of at least about 1.07, more desirably at least about 1.11. The specific gravity of the resin-forming material can be adjusted by the addition of weighting agents. Suitable weighting agents include water-soluble, non-ionizing organic compounds, e.g. sugar and glycerol. Calcium chloride, as noted above for instance, in amounts from about 15 to 30 or more weight percent can be used when it is desired to place the resin-forming material on the bottom of a well bore.

The present invention can be used in a method employed in plugging a permeable well location, for instance, in a method described in copending application Serial No. 642,867, filed February 27, 1957, now Patent No. 3,044,548, issued July 17, 1962, hereby incorporated by reference. In this method the area to be plugged is first located as to its vertical position in the well bore. This area is spaced away from the bottom of the bore and generally will be between two adjacent areas of lesser permeability although this is not an absolute necessity. Salt (NaCl) water or brine is then provided in the well bore in an amount sufficient to reach the approximate location of the area to be plugged. The level of the salt water can be at or slightly below or above the plugging area but it should not be vertically displaced a distance from the area such that substantial plugging occurs in locations where it is not desired. The salt water can be added as such to the well, or fresh water can be injected which after remaining a sufficient period in the bore will become salty due to the presence of salt in the earth's strata. After the proper level of salt water is established the organic resin-forming material is positioned on this medium. Preferably, the salt water layer is below a fresh water layer with these materials forming an interface in the approximate location of the permeable area, and in this case the resin-forming material is positioned on the salt water layer and thus in the interface between these layers. The resin-forming material is then displaced into the adjacent well area or stratum as by natural flow or by a separately applied gaseous or liquid pressure to one or both of the water layers and allowed to remain in the area to set up or harden to provide a partial or complete plug resistant to the flow of fluids, particularly liquids. The permeable area to be plugged can be located by conventional procedures, e.g. the use of liquid-to-liquid interfaces between two dissimilar liquids such as water and oil, fresh and salt water, and radioactive and non-radioactive liquids, e.g. see U.S. Patents Nos. 2,376,878 and 2,413,435 and Pfister, R. J., Trans, A.I.M.E., vol. 174, page 269, 1948, to determine the injectivity profile or liquid injection characteristics of the well or sand face.

The detection means employed for tracking the position of the resin-forming material in the well bore in this method can vary. In one method using a secondary buffer, the characteristics of the material can be such that it is detectable by an electrical conductivity profiling unit when the secondary buffer is placed on the resin-forming material. Thus, if the secondary buffer is essentially non-conductive and the resin-forming composition is essentially conductive the conductivity profiling unit will indicate the degrees of current flow within the resin-forming composition and secondary buffer. Accordingly, when the conductivity circuit is essentially poor, the instrument is in the secondary buffer and when the conductivity circuit is essentially good, the instrument is in the resin-forming composition. Thus by raising and lowering the instrument the interface in be-between the resin-forming material and the secondary buffer can be located and by checking the depth of the detection instrument the location of the upper layer of the resin-forming material is known.

A device suitable for use in measuring the electrical conductivity of the fluids in the well bore is described in U.S. Patent No. 2,776,563. This device, known as a magnetic coupler, includes a magnetic core, and two electrically conducting coils essentially composed in two basic combinations. One of the combinations, conveniently referred to as a magnetic coupler sub, is essentially comprised of one of the coils, the first coil, surrounding the magnetic core, and fixedly mounted within a structure. The other combination, conveniently referred to as the stinger, comprises a cable containing an insulated electrical conductor communicating with the other coil which is contained within a structure adapted to removably surround the first coil. Under operational conditions the magnetic coupler sub may be installed in a position just above the drill bit in a rotary type drill string. Accordingly, when the position of a liquid of known electrical conductivity within the well bore is desired, the stinger is lowered into the drill pipe string and joined to the magnetic coupler sub, the drill pipe is maneuvered until the liquid or the interface between liquids is located, and by noting the depth of the stinger, the position of the liquid or the interface between two liquids known.

Additionally, if a two-conductor cable is employed as in the stinger arrangement, the stingers itself can be used as the detection means.

By following the present invention in one embodiment, after the resin-forming material is displaced into the adjacent well area, the ascorbic acid triggering composition can be conducted into the well bore, the resin-forming material, in this instance an aqueous solution of alkylidene bisacrylamide and an ethylenic monomer receives the ascorbic acid triggering composition which is dispersed in the resin-forming material and polymerzaton is effected. The material polymerizes to a solid and thus seals the permeable formation.

The present invention can also be used in a method for combatting the effect of a reduction or a cessation of the air circulation in air-drilling methods when drilling through permeable areas from which gas, liquid or loosely consolidated strata enters the well bore being drilled. The desired result is accomplished by selectively and substantially completely sealing formations of this character from the well bore in an expeditious and economical manner so as to maintain the advantages of the air-drilling procedures over the conventional procedures which use mud as the circulating medium.

According to this method, when an obstruction of air circulation, i.e. a reduction or cessation thereof, is experienced during an air-drilling operation and the obstruction is attributed to the ingress of gas, liquid or loosely consolidated earth particles into the bore from an adjacent stratum, the resin-forming material is introduced into a string of tubing extending downwardly below the permeable formation. The resinous material which is generally weighted, e.g. with $CaCl_2$, to be heavier than salt water, is conducted downwardly in the tubing. A first portion of the resinous material is conducted through the lower extremity of the tubing and forms a column in the annular space between the tubing and the wall of the well bore which column at least covers the formation to be sealed. The level of this annular column is maintained while the upper level of the remaining or secondary portion of the resinous material in the tubing is pressured to force permeable formation sealing amounts of resinous material into the permeable formation. The resinous material is maintained in this position until it substantially solidifies. The solid resin is drilled through and drilling is continued with gas circulation to remove cuttings from the well.

This material is of the type that will harden at temperatures encountered in the well bore, which in many cases are between about 50 to 200° F. The quantity of resin-forming material used is preferably adequate to extend horizontally into the formation of ingress for a distance sufficient to securely seal this formation subsequent to the hardening of the resinous material to prevent further ingress of unwanted extraneous materials. This distance usually extends at least about six inches into the formation. Moreover, in this method it is preferred that the resin-forming composition occupy the well bore adjacent the formation of ingress when the hardened resin is formed. Accordingly, after the introduction of the resin-forming composition, which has a specific gravity higher than the ingressing well fluid, into the well bore detection means are employed to track the upper level of the resin-forming composition, and gas or liquid, e.g. air or water pressure is applied to bring this upper level approximately adjacent the upper level of the strata of ingress, the triggering composition is added, and the resinous composition is maintained in this position until it solidifies. Although air, other gas or liquid pressure can be employed in our method, air is preferable since (a) it permits better control of the resin-forming material, and (b) the well bore is drier following the polymerization of the resin-forming composition and no time must be spent drying the hole before drilling. The gas pressure will depend upon the nature of the obstruction encountered and the depth of the permeable formation; it is generally greater than about 150 p.s.i. but is usually about 150 to 1000 p.s.i. Since tremendous pressures can be required, it may be desirable to produce such pressures by employing liquid and gas in combination, e.g. provide a liquid column above the resin-forming composition and exert air pressure on the liquid column. Following solidification of the resinous composition, air-drilling is resumed.

As an example, the method of the present invention can be incorporated in this gas-drilling method after the resin-forming material is in place. At this point, the ascorbic acid triggering composition can be lowered into the well bore hole inside the drill pipe to a point of contact with the resin-forming material to effect polymerization of the material.

The method of the present invention can also be used in another method for combatting the effect of a reduction or a cessation of the air circulation in air-drilling methods in which the resin-forming material is of a specific gravity lighter than salt water and described in copending application Serial No. 686,198, filed September 25, 1957, now Patent No. 3,011,547, issued December 5, 1961. It can also be used in another method which is set forth in Example I.

The following specific examples will serve to illustrate this invention but are not be considered limiting.

EXAMPLE I

The method of this invention as used in an air-drilling method can best be described with reference to a specific example and the drawing. FIGURES 1 through 6 set forth several distinct phases of the method.

Referring to the drawing, FIGURE 1, the numeral 10 represents the earth's surface through which a well bore 12 is being drilled to an oil-producing formation with rotary drill pipe 14 containing a rotary bit 16 at the lower end. Pressurized air is introduced to drill pipe 14 at the surface of the earth, is conducted downwardly therein, exits through opening 15 of rotary drill bit 16 at the site or formation of drilling 18, and passes upwardly through annulus 20, surrounding drill pipe 14, carrying relatively small as well as larger rock particles from the site of drilling to the earth's surface.

Figure 2:
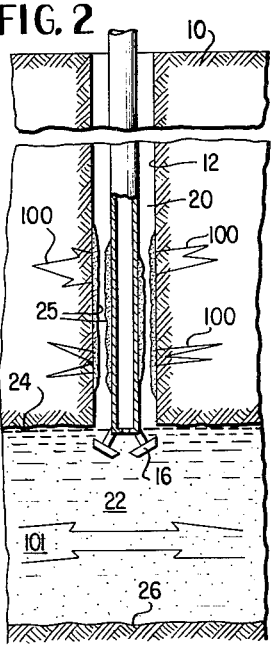
Figure 3:
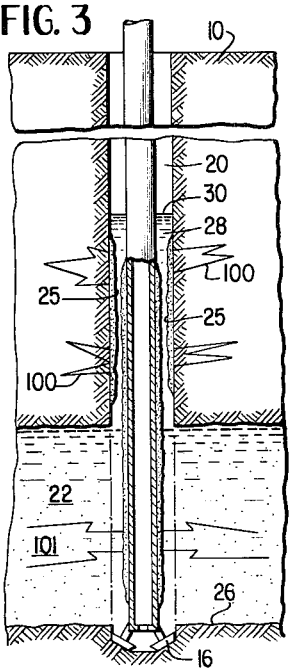

In FIGURE 2 rotary drill bit 16 passes through crevices 160, and penetrates a salt water formation 22 at its upper level 24 as indicated by a reduction in air circulation as well as the muddy nature of the particles recovered from the site of drilling. Water cuttings 25 stick to the well bore and drill pipe. The depth of the drill bit is noted and thus the position of upper level 24 of salt water formation 22 is known. In FIGURE 3 drilling is continued through the salt water-bearing formation containing crevice 101, air circulation eventually ceases due to the accumulation of water cuttings 25 in the annulus and the back pressure of the salt water, a column of salt water 28 rises in the well bore to level 30 in annulus 20, the lower level 26 of salt water formation 22 is penetrated by rotary drill bit 16 and drilling is discontinued. Occasionally, in cases where the water formaton is of considerable depth, it may not be possible to penetrate the lower level of the formation before water production stops further drilling.

Figure 4:
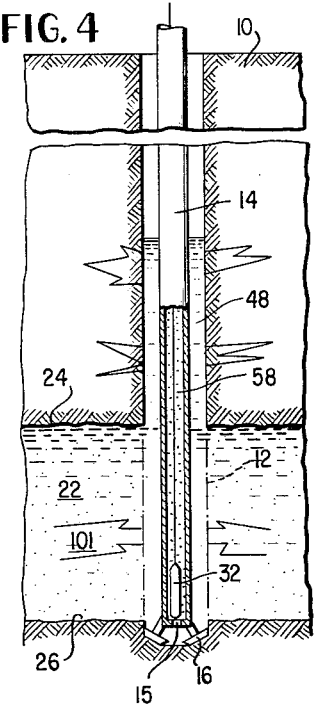

In FIGURE 4 capsule 32 containing triggering composition is lowered through a pressure seal (not shown) screwed to the top of the drill pipe and is placed in position near opening 15 in drill pipe 10. The capsule contains 40 grams of ferrous ammonium sulfate, 10 grams of ascorbic acid, 10 ml. conc. HCl (37%), and 120 cc. of water. An amount of resinous material 58 at least sufficient to cover the portions of formation 22, about a 30-foot section, exposed to well bore 12, for instance a total of about 300 gallons of resinous material, weighted, e.g. with 30% $CaCl_2$, to be heavier than the salt water in the well bore, consisting esssentially of 10 parts by weight of a mixture of 5% N,N'-methylene-bisacrylamide and 95% acrylamide, 30 parts of $CaCl_2$ and 60 parts water, is injected down drill pipe 14 at a rate of 10 gallons per minute, is catalyzed by triggering solution released by capsule 32 in an amount of 10 cc./gal. of resin-forming material passing through opening 15 and into the formation.

Figure 5:
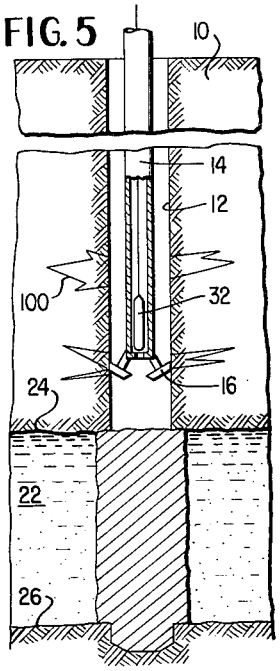

As the catalyzed resinous material is pumped through opening 15 and into the annulus formed between the drill pipe and the well bore walls, the drill pipe is raised at a rate of one foot per minute to inject plastic into the well bore and surrounding formation at a desired rate to the position shown in FIGURE 5. In this operation the pressure of the pumped resinous material is sufficient to force a significant quantity into the adjacent formation as the drill pipe is raised. The resinous material displaces salt water in the formation and sets in 3 to 5 seconds. In FIGURE 5 the drill pipe and bit are in the lifted position as shown and the resinous material has set. Pressure, with air for instance, can be applied to the annulus of the well to force the resin-forming material into the formation and prevent it from going around the drill bit and setting above the bit.

Figure 6:
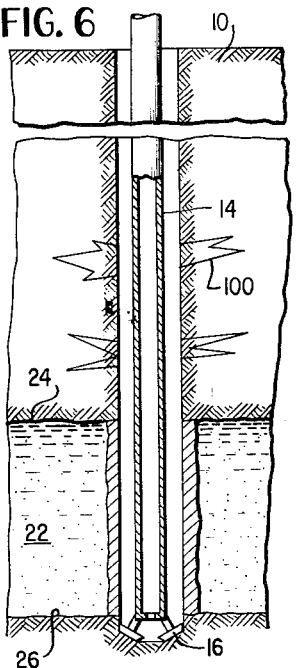

In FIGURE 6, following the solidification of the resinous material, the salt water is blown out, air circulation down drill pipe 14 to rotary drill bit 16 is initiated, drilling is resumed, the solidified resinous material is drilled through, and the drilling continues downwardly into the earth's surface while removing cuttings from the well bore by air circulation down the drill pipe and up the well annulus.

EXAMPLE II

The following example illustrates a method, using the liquid resin-forming materials and polymerization technique described above, to plug a permeable subterranean well area.

A specific example of our method can be illustrated by references to a field operation which is not to be considered limiting either procedurally or with respect to the composition of the resin-forming material. In this operaton the well is a water flood injection well having a 1½" diameter cement tubing and a shot bore hole. Three days were spent cleaning out the well by pumping water in and out of the bore hole using a ½" pipe wash string. An injection profile is obtained by the constant interface method using fresh and salt water and the well is found to be fractured at about 814½' from ground level. The total injection rate of the well is about 1 gallon per minute of fresh water at a well head pressure of 230 p.s.i.g. Five gallons of untriggered resin-forming material, including:

|   | Wt. percent |
|---|---|
| Acrylamide | 19 |
| N,N'-methylenebisacrylamide | 1 |
| Water | Balance | and with the following properties at about 75° F.:

|   | Centipoises |
|---|---|
| Viscosity | 1.3 |
| Specific gravity | 1.12 | are passed down a ½" tubing which contained a conductivity profiling unit, see U.S. Patent No. 2,894,200. The resin-forming material passes by the unit and emerges from the pipe or tubing piece extending from its lower end positioned at the interface between a lower layer of salt water and an overlying layer of fresh water which is formed at about 814½' down the well. The resin-forming material is displaced down the ½" tubing at the rate of about 1 gallon per minute and while this is being done fresh water is bled at the well head from the annulus between the ½" tubing and the 1½" cement tubing. After all of the resin-forming material is in the ½" tubing a slug of salt water is added to provide a flush. During the charging of the resin-forming material into the ½" tubing string neither salt nor fresh water is added to the well. After the resin-forming material is placed in the salt-fresh water interface, the lower end of the profiling unit tubing is lowered into the salt water layer; and brine is then pumped down this tubing at the rate of 0.5 gallon per minute while fresh water is charged to the annulus between the ½" tubing and the 1½" cement tubing at the rate of 0.5 gallon per minute. By lowering and raising the profiling unit tubing, while insuring that the bottom end of its lower tubing piece remained in the salt water level, the top of the resin-forming material layer is located at 814' while the bottom is at 815'. This determination is made immediately after the resin-forming material is placed in the interface. This particular resin-forming material is of a specific gravity of about 1.12 and, is substantially non-conductive so that it could be distinguished from both the salt and fresh water layers by the use of the conductivity profiling instrument. Two minutes after the first check on the resin-forming material only about 0.1' of it could be located by the profiling unit and in less than 1 additional minute the material is completely displaced or moved into the adjacent formation.

Shortly after the untriggered resin-forming material had been displaced into the adjacent formation, 5 additional gallons of this material, an essentially electrically non-conductive mixture and having a specific interface by the procedure noted above except that the resin-forming material is flushed down the profiling unit tubing by fresh water. Immediately upon the placing of the resin-forming material in the interface the profiling unit detects it at a position slightly above 814½', the location of the fracture. However, as the permeability of the well at locations other than the fracture was relatively low, the resin-forming material is displaced into the adjacent area through the fracture by continuing the fresh water and brine flows at the rate of 0.5 gallon per minute. A dumping vessel containing a triggering solution including 5 grams ascorbic acid, 20 grams ferrous ammonium sulfate, 5 ml. concentrated HCl (37%), and 60 cc. water, is lowered to the lowermost level of, and is moved upwardly through, the material which is one foot in depth. The material receives the triggering solution and the monomers in the material are polymerized expeditiously.

In view of the above illustrations, it will be apparent to those versed in the art that it is desirable to add the triggering solution to the resin-forming materials while these materials are in a relatively accessible position in the well bore. For instance, in another procedure, the triggering solution is incorporated into resin-forming material in the well bore hole in the event the material is to be passed into a subterranean formation.

EXAMPLE III

The following data provide physical characteristics for typical compositions of AM–9 (an aqueous solution of resin-forming material containing 10% of a mixture of 5% N,N'-methylenebisacrylamide and 95% acrylamide) at various temperatures and with various contents of $CaCl_2$ weighting agent.

The following specifications are given:

*Viscosity*

|  | Specific gravity | Centistokes | Centipoises |
|---|---|---|---|
| At 70° F | 1.1639 | 1.8093 | 2.1058 |
| At 85° F | 1.1608 | 1.4942 | 1.7345 |
| At 100° F | 1.1557 | 1.2762 | 1.4749 |
| At 120° F | 1.1556 | 1.0321 | 1.1950 |
| At 135° F | 1.1555 | .9291 | 1.037 |

*Specific gravities of 10% AM mixtures*

|  | Specific gravity |
|---|---|
| No $CaCl_2$ | 1.008 |
| 10% $CaCl_2$ | 1.060 |
| 20% $CaCl_2$ | 1.125 |
| 26% $CaCl_2$ | 1.160 |
| 30% $CaCl_2$ | 1.180 |

AM–9 containing 15% $CaCl_2$ and 2 gms. per liter of ammonium persulfate was polymerized with the following trigger composition:

20 gms. of ferrous ammonium sulfate
5 gms. of ascorbic acid
60 cc. of water
5 ml. of concentrated HCl the following gel times were obtained:

| cc./gal. of trigger: | Gelled in seconds |
|---|---|
| 1.514 | 12 |
| 2.271 | 11 |

EXAMPLE IV

The data presented in the following tests illustrate the propagation of a pre-catalyzed plastic mix.

In order to determine if a plastic mix with an ammonium persulfate (AP)-nitrilotrispropionamide (NTP) redox system, set to polymerize after a long interval, e.g. 67–70 min., could be completely polymerized in a short interval, e.g. 10–15 min., by quick triggering a part of the plastic mix, the following tests were made.

Two 55-gallon open top drums were fitted with a 2 inch pipe running to the bottom of the drum and then filled with sand. The plastic was pumped down the 2 inch pipe and into the sand. The drums were filled with plastic and the last 10 gallons quick triggered to polymerize the plastic in the 2 inch pipe and in the lower part of the drum.

| | Composition |
|---|---|
| AM–9, percent in water | 10 |
| $CaCl_2$, flake, percent | 30 |
| Amount, gal | 60 |

AP, .01% by weight=.3785 gms./gal.=22.7 gms./60 gal.
NTP, .02% by weight=.7570 gms./gal.=45.4 gms./60 gal.

This amount of AP–NTP in 10% AM–9 with 30% $CaCl_2$ at 84° F. would cause polymerization in 65 minutes. Temperatures of mix, 84° F.

*Test*

The plastic was run into the pipe and conducted into the sand in the drum at a very slow rate, 12 g.p.m., and after filling the sand in the drum with plastic, chemical trigger of composition used above in Example III was pumped in, by way of the pipe, at a rate of 20 cc. for 5 seconds or 240 cc./min. or 20 cc./gal. of plastic.

The plastic fluid channeled around the 2-inch pipe and surged out of the drum. Final polymerization was accomplished by lowering the end of the chemical feed line to the bottom of the 2 inch pipe and pumping chemical trigger while slowly withdrawing the feed line. The plastic in the 2 inch pipe polymerized at once (15 seconds) and polymerization of the plastic outside the 2 inch pipe was observed by the rise in temperature. The temperature of the sand was 32° F. before the start of the test. After pumping in the plastic the temperature of the unpolymerized plastic was 48° F. The following temperatures and distances from the center 2 inch pipe were observed.

| Time, p.m. | Temperature, F. | Distance from 2″ Pipe, inches |
|---|---|---|
| 2:00 | 48 | 0 |
| 2:05 | 68 | 2 |
| 2:08 | 78 | 2 |
| 2:10 | 78 | 2 and 4 |
| 2:12 | 78 | 2 and 4 |
| 2:12 | 48 | 6 |
| 2:15 | 76 | 2 |
| 2:15 | 78 | 4 |
| 2:15 | 48 | 6 |

Definite indications of propagation of polymerization were observed, but operations were hindered by the low temperature (32° F.) of the sand pack.

The amount of $CaCl_2$ employed in the composition and temperatures at which the composition is set can influence the set or polymerization time depending upon the amount or concentration of triggering composition used. For instance, it is indicated that high amounts of $CaCl_2$ (e.g. 30%), tend to minimize set time. It is also indicated that higher temperatures tend to minimize set time. The amount of chemical trigger used per gallon can vary with the temperature and amount of the $CaCl_2$ to provide a desired polymerization time. For example: 5.3 cc./gal. into a 30% $CaCl_2$, 80° F. mix set in 15.8 seconds (Test No. 2C), while 15.6 cc./gal. into a 20% $CaCl_2$, 56° F. mix set in 36 seconds (Test No. 1B).

A catalyst injector that can be advantageously employed in disseminating the ascorbic acid triggering composition, in place of capsule 32, into the resin-forming material in a well bore is shown in the drawings, FIGURES 7 and 8.

The catalyst injector includes catalyst containing case 211 having catalyst chamber 215 and valving means comprising valve head 217, valve stem 208 and valve stem extension 203 which is adjustably secured to stem 208. The catalyst containing case includes a dispersing tip 213 having apertures 225 for dispersing catalyst released from chamber 215 into the resin-forming material. Valve stem extension 203 includes a hollow portion 219 and elliptically slotted sides 220. The proper length of valve stem 208 and extension 203 to effect a seal between valve head 217 at O ring 212, as shown in the drawing, is obtained by adjusting their matchingly threaded portions 221 and 222 to the length desired and then locking stem 208 and extension 203 together with locking nut 207. Catalyst is held in chamber 215 under pressure and the internal pressures are maintained by placing valve head 217 in a closed position at one end of the chamber and disposing packing gland 210 and packing bushing 209 around valve stem 208 at the other end.

The valving means are operatively associated with cam 204 which is shown in a cocked position in the drawing and which pivots on pin 205. Pin 205 is fixedly supported by two parallel arms 206 spaced on opposite sides of extension 203 and fixedly secured to case 211. A top view taken along line 8—8 of FIGURE 7 is presented in FIGURE 8 to elaborate on the arrangement between the noted members.

When loading catalyst chamber 215 with catalyst, cam 204 is in an uncocked position as illustrated by the dotted lines, pin 205 is at the top of slot 220, and valve head 217 is in an open position due to support of case 211. Dispersing tip 213 is removed, catalyst is charged into chamber 215 under pressure, and cam 204 is cocked to the position shown in FIGURE 7 to raise valve stem 208 and extension 203, to sealingly engage valve head 217 and O ring 212. The catalyst is sealed in chamber 215 under pressure and dispersing tip 213 is screwed on.

In operation the catalyst injector, in the cocked arrangement shown in the drawing, is lowered into position in a well bore for instance, by wire line 201 or other means secured to valve stem extension 203 by means of set screws 202. The catalyst is released by sending a device commonly known as a "go-devil" down wire line 201 which trips cam 204. When cam 204 is tripped, the internal pressure in chamber 215 forces (a) container 211 and arms 206 upwardly in relation to the valving means to separate valve head 217 from O ring 212 since pin 205 can now move into the upper portion of slot 220 as shown by the dotted lines and (b) catalyst into dispersing tip 213 for release into the resin-forming material. As the catalyst is released from chamber 215, the pressure in chamber 215 is reduced and eventually the weight of containing case 211 overcomes the reduced pressure and lowers to a position wherein O ring 212 is biased against valve head 217. The catalyst injector device is then removed from the well bore and can be recharged with catalyst for repeated use.

It is claimed:

1. A method for expeditiously copolymerizing an aqueous solution consisting essentially of a mixture of (a) about 1 to 25 weight percent of a monomeric alkylidene bisacrylamide of the formula

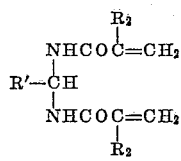

in which

is a hydrocarbon residue of an aldehyde containing from about 1 to 10 carbon atoms and $R_2$ is of the group consisting of hydrogen and methyl, (b) 75 to 99 weight percent of another ethylenic monomer copolymerizable with (a), and (c) catalytic amount of an oxidizing agent which is a peroxy catalyst derived from a per-acid, the step comprising contacting the mixture with a composition containing catalytic amounts of ascorbic acid and a water-soluble inorganic ferrous compound to obtain copolymerization to a solid material.

2. The method of claim 1 wherein the composition includes solublilizing amounts of a strong mineral acid.

3. The method of claim 2 wherein the bisacrylamide is N,N'-methylene-bisacryamide.

4. The method of claim 3 wherein the ethylenic monomer is acrylamide and the aqueous solution contains polymerization expediting amounts of a Group I to III metal halide.

5. The method of claim 4 wherein the halide is calcium chloride and the oxidizing agent is ammonium persulfate.

6. A method of decreasing the permeability of a permeable area in a well, the steps comprising introducing an aqueous solution containing a mixture of (a) about 1 to 25 weight percent of a monomeric alkylidene bisacrylamide of the formula

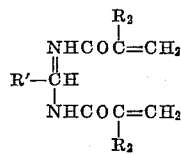

in which

is a hydrocarbon residue of an aldehyde containing from about 1 to 10 carbon atoms and $R_2$ is of the group consisting of hydrogen and methyl, (b) about 75 to 99 weight percent of another ethylenic monomer copolymerizable with (a) and (c) a catalytic amount of an oxidizing agent which is a peroxy catalyst derived from a per-acid, into a permeable area, contacting the aqueous mixture with a composition containing a catalytic amount of ascorbic acid and a water-soluble inorganic ferrous compound, in the presence of a Group I to III metal halide to solidfy the aqueous mixture therein and decrease the permeability of the well area.

7. The method of claim 6 wherein the composition includes solubilizing amounts of a strong mineral acid.

8. The method of claim 7 wherein the bisacrylamide is N,N'-methylene-bisacrylamide.

9. The method of claim 8 wherein the ethylenic monomer is acrylamide.

10. The method of claim 9 wherein the halide is calcium chloride, the oxidizing agent is ammonium persulfate, and the catalytic composition contains reducing amounts of the ferrous compound.

11. A method for expeditiously copolymerizing an aqueous solution consisting essentially of a mixture of (a) about 1 to 25 weight percent of a monomeric alkylidene bisacrylamide of the formula

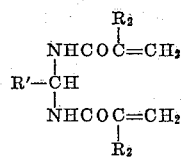

in which

is a hydrocarbon residue of an aldehyde containing from about 1 to 10 carbon atoms and $R_2$ is of the group consisting of hydrogen and methyl, (b) about 75 to 99 weight percent of another ethylenic monomer copolymerizable with (a), and (c) catalytic amount of an oxidizing agent which is a peroxy catalyst derived from a per-acid, the step comprising contacting the mixture with a triggering composition containing ascorbic acid in amounts from about 0.1 to 10 parts by weight of said triggering composition, ferrous ammonium sulfate in amounts from about 1 to 50 parts by weight of said triggering composition and a strong, non-oxidizing, inorganic mineral acid in amounts from about 0.03 to 7 parts by weight of said triggering composition.

12. A method for decreasing the permeability of a permeable area in a well, the steps comprising introducing an aqueous solution containing a mixture of (a) about 1 to 25 weight percent of a monomeric alkylidene bisacrylamide of the formula

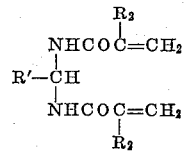

in which

is a hydrocarbon residue of an aldehyde containing from about 1 to 10 carbon atoms and $R_2$ is of the group consisting of hydrogen and methyl, (b) about 75 to 99 weight percent of another ethylenic monomer copolymerizable with (a) and (c) a catalytic amount of an oxidizing agent, into a permeable area, contacting the aqueous mixture with a triggering composition containing ascorbic acid in amounts from about 0.1 to 10 parts by weight of said triggering composition, ferrous ammonium sulfate in amounts from about 1 to 50 parts by weight of said triggering composition and a strong, non-oxidizing, inorganic mineral acid in amounts from about 0.03 to 7 parts of weight of said triggering composition.

13. A catalytic composition for catalyzing the polymerization of polymerizable monomers consisting essentially of about 0.1 to 10 parts by weight of an aqueous solution of ascorbic acid, about 1 to 50 parts by weight of ferrous ammonium sulfate and about 0.03 to 7 parts by weight of a strong, non-oxidizing, inorganic mineral acid.

14. The composition of claim 13 wherein the mineral acid is HCl.

References Cited by the Examiner

UNITED STATES PATENTS

| | | | |
|---|---|---|---|
| 2,762,791 | 9/56 | Pease et al. | 260—94.9 |
| 2,801,984 | 8/57 | Morgan et al. | 166—33 |
| 3,011,547 | 12/61 | Holbert et al. | 166—33 |
| 3,056,757 | 10/62 | Rakowitz | 166—33 |

CHARLES E. O'CONNELL, *Primary Examiner.*

UNITED STATES PATENT OFFICE
CERTIFICATE OF CORRECTION

Patent No. 3,199,589                        August 10, 1965

John L. Boyd et al.

It is hereby certified that error appears in the above numbered patent requiring correction and that the said Letters Patent should read as corrected below.

Column 4, line 1, after "polyethylene" strike out the comma; lines 26 and 27, after "lactate" insert a comma; column 8, line 67, for "10" read -- 14 --; column 11, line 20, for "67-70" read -- 60-70 --; column 13, line 20, after "(b)" insert -- about --; line 38, for "of", first occurrence, read -- for --; same column 13, lines 43 to 48, the formula should appear as shown elow instead of as in the patent:

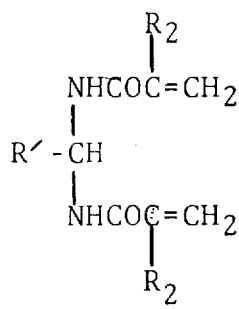

Signed and sealed this 29th day of March 1966.

SEAL)
test:

NEST W. SWIDER                        EDWARD J. BRENNER
testing Officer                        Commissioner of Patents